(12) United States Patent
Lafon

(10) Patent No.: US 6,440,914 B1
(45) Date of Patent: Aug. 27, 2002

(54) LIQUID DE-INKING COMPOSITIONS BASED ON POLYALKOXYLATED TERPENIC COMPOUNDS AND THEIR USE FOR DE-INKING

(75) Inventor: Marie-Odile Lafon, Paris (FR)

(73) Assignee: Rhodia Chimie, Cedex (FR)

( * ) Notice: Subject to any disclaimer, the term of this patent is extended or adjusted under 35 U.S.C. 154(b) by 0 days.

(21) Appl. No.: 09/674,325

(22) PCT Filed: Apr. 26, 1999

(86) PCT No.: PCT/FR99/00983

§ 371 (c)(1),
(2), (4) Date: Mar. 29, 2001

(87) PCT Pub. No.: WO99/55786

PCT Pub. Date: Nov. 4, 1999

(30) Foreign Application Priority Data

Apr. 28, 1998 (FR) .............................. 98/05316

(51) Int. Cl.[7] .......................... C09D 11/02; C11D 3/20; C11D 3/44
(52) U.S. Cl. ................ 510/174; 510/170; 510/171; 510/172; 510/173; 510/201; 510/365; 134/38; 134/40; 134/41; 134/42
(58) Field of Search .................... 134/113, 19, 28, 134/32, 38, 39, 40, 41; 510/170, 171, 174, 201, 365, 172, 173

(56) References Cited

U.S. PATENT DOCUMENTS

| 4,590,302 A | * | 5/1986 | Scheidl et al. |
| 5,454,878 A | * | 10/1995 | Bala et al. |
| 5,665,690 A | | 9/1997 | Halar et al. |
| 5,674,823 A | * | 10/1997 | Ricca et al. |

FOREIGN PATENT DOCUMENTS

| GB | 2121071 A | 12/1983 |
| WO | 9616132 A | 5/1996 |

* cited by examiner

Primary Examiner—Yogendra N. Gupta
Assistant Examiner—Gregory E. Webb
(74) Attorney, Agent, or Firm—Burns, Doane, Swecker & Mathis, L.L.P.

(57) ABSTRACT

The invention concerns a liquid de-inking composition comprising at least a surfactant of polyalkoxylated terpenic origin of formula: $Z-X-W-[CH-(R^5)CH(R^6)-O]_q-A$ wherein: Z is a bicycloheptenyl or bicycloheptyl radical, preferably substituted by methyl radicals; X is preferably a $-CH_2-CH_2-O-$ or $-O-CH_2-CH_2-O-$ radical; W is a polysequence, preferably polyoxypropylene and polyoxyethylne sequence; $[CH(R^5)-CH(R^6)-O]_q$ is a sequence different from a polyoxyethylene, preferably polyoxypropylene sequence; A is a hydrogen atom, a hydrocarbon or functional group. Said composition can be used for de-inking paper.

7 Claims, No Drawings

LIQUID DE-INKING COMPOSITIONS BASED ON POLYALKOXYLATED TERPENIC COMPOUNDS AND THEIR USE FOR DE-INKING

The present invention relates to a liquid composition for de-inking paper, used in the regeneration of pulp obtained from old printed newspapers, magazines, photocopies and computer papers. The present invention also relates to the use of a liquid de-inking composition for de-inking paper.

A subject of the present invention is mainly a liquid de-inking composition and its use, which are adapted for de-inking paper by flotation and/or washing, making it possible to obtain a high-quality regenerated pulp having a high whiteness index and a very low residual content of ink and ensuring a stable and reliable de-inking process. The de-inking operation is very important since it represents one of the fundamental steps for the recycling of old papers.

Many methods for de-inking old papers are known. The recycling of old papers has become a very important industry in which it is desired to develop and establish novel de-inking compositions and their processes using them, which consume little in the way of energy and natural resources and have little environmental impact, while at the same time providing high-quality regenerated pulp.

The conventional and usual processes for de-inking old papers to give base material for papermaking are divided into two categories; the first is a process of de-inking by flotation, and the second is a process of de-inking by washing.

These de-inking processes essentially comprise two phases. The first consists in defibring the old papers, this operation also known as pulping, and the second consists in removing the ink by flotation or washing.

The first phase is carried out by placing in contact, with stirring, old papers with water and a chemical system generally comprising a silicate, a basic agent, a soap or a surfactant, for example an ethoxylated and/or propoxylated fatty alcohol, and a bleaching agent, which are introduced separately. Once the papers have been defibred, according to a first alternative, the pulp is diluted and transferred into a flotation cell into which air is injected via the bottom of the tank. This then produces a foam which entrains the ink particles, either by overflow from the tank containing the pulp, or by suction. According to a second alternative, the pulp is diluted and washed with water, and then separated from the ink particles dispersed in the water by filtration or centrifugation, this step being repeated as many times as necessary in order to obtain a pulp whose qualities are suitable for it to be reused. A third alternative consists in combining the washing and flotation steps to separate the ink from the pulp.

The chemical systems used in de-inking are generally selected as a function of the method of separation of the pulp and the ink particles.

For the processes of separation by washing, the chemical system must be virtually non-foaming under the operating conditions in order to limit any mechanical problem in the devices used. Furthermore, the ink particles to be extracted from the pulp should be fine and well dispersed in the presence of the chemical system in order to increase the efficacy of separation of the said particles and to obtain a high-quality pulp.

For the processes of separation by flotation, the chemical system should have foaming properties that are greater than those of the washing processes. Specifically, the ink particles in this case adhere to the foam generated in the flotation cell, thereby allowing them to be separated from the pulp. Moreover, the ink particles must be capable of agglomerating to form large-sized aggregates, which also facilitates and increases their separation from the pulp and their removal by air bubbles.

The Applicant has developed a novel liquid composition for de-inking paper which can be used both in processes of de-inking by flotation and in processes of de-inking by flotation and washing.

The novel liquid composition according to the invention affords a high-quality regenerated pulp with a high whiteness index and a very low residual content of ink, while at the same time ensuring a highly efficient and reliable industrial process using the said composition. In addition, the liquid composition according to the invention has the advantage of having virtually no ecotoxicity, and therefore its use for de-inking paper has virtually no environmental impact.

Other advantages and characteristics of the invention will emerge more clearly on reading the description and examples which follow.

The novel liquid de-inking composition developed by the Applicant comprises at least one surfactant of polyalkoxylated terpenic origin of formula:

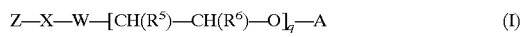

$$Z-X-W-[CH(R^5)-CH(R^6)-O]_q-A \qquad (I)$$

in which:

the symbol Z represents a bicyclo[a,b,c]heptenyl or bicyclo[a,b,c]heptyl radical, optionally substituted with at least one $C_1$–$C_6$ alkyl radical, preferably methyl, a, b and c being such that:
  a+b+c=5,
  a=2, 3 or 4,
  b=1 or 2,
  c=0 or 1, the symbol X represents a group:
  —$CH_2$—$C(R^1)(R^2)$—O— in which the symbols $R^1$ and $R^2$, which may be identical or different, represent a linear or branched $C_1$–$C_6$ (cyclo)alkyl or (cyclo)alkenyl group, in particular methyl, or preferably a hydrogen atom,
  or —O—$CH(R'^1)$—$CH(R'^2)$—O— in which the symbols $R'^1$ and $R'^2$, which may be identical or different, represent a linear or branched $C_1$–$C_{22}$ (cyclo)alkyl or (cyclo)alkenyl group, in particular methyl, or preferably a hydrogen atom, the symbols $R^5$ and $R^6$, which are different, represent for one a hydrogen atom and for the other a linear or branched $C_1$–$C_{22}$ (cyclo)alkyl or (cyclo)alkenyl group, preferably methyl, q is an average value between 1 and 30, preferably between 5 and 20, W represents a polyblock group consisting of different blocks —$[B]_n$— and —$[C]_p$—,
  B representing a group —$CH(R^3)$—$CH(R^4)$—O—, in which $R^3$ and $R^4$, which may be identical or different, represent a hydrogen atom or a linear or branched $C_1$–$C_{22}$ (cyclo)alkyl or (cyclo)alkenyl group, preferably methyl, $R^3$ and $R^4$ being different when one of them represents hydrogen,
  C representing an oxyethylenated group —$CH_2$—$CH_2$—O— (EO),
  n being an average value between 1 and 10, preferably between 2 and 4,
  p being an average value between 1 and 100, preferably between 3 and 20,
  the said polyblock group W being linked to the unit X via one of its blocks —$[B]_n$—, A represents a hydrogen atom, a $C_1$–$C_6$ alkyl radical, an aryl or alkylaryl radical, a halogen atom, a group —$CH_2$—$CH(OH)R^7$, in which the symbol R represents a linear or branched or cyclic $C_1$–$C_{22}$ alkyl or aryl radical, or a group chosen from —$SO_3M$, —$OPO_3(M)_2$, —$(CH_2)_a$—COOM, —$(CH_2)_b$—$SO_3M$, with a and b ranging from 1 to 6, M representing H, Na, K, Li, $N(RR'R''R''')^+$ in which the symbols R, R', R" and R''' are identical or different and represent a hydrogen atom or a linear or branched or cyclic, optionally hydroxylated, $C_1$–$C_{22}$ alkyl radical.

The symbol Z preferably represents a radical $Z^1$ or $Z^2$, $Z^1$ being a radical such as:

bicyclo[3.1.1]heptenyl, preferably substituted on its carbon atom in position 6 with at least one $C_1$–$C_6$ alkyl radical, most particularly with two methyl radicals, the said bicyclo[3.1.1]heptenyl radical being linked to the unit X of formula —$CH_2$—$C(R^1)(R^2)$—O— via its carbon atom in position 2;

or bicyclo[2.2.1]heptenyl, preferably substituted on its carbon atom in position 7 with at least one $C_1$–$C_6$ alkyl radical, most particularly with two methyl radicals, the said bicyclo[2.2.1]heptenyl radical being linked to the unit X of formula —$CH_2$—$C(R^1)(R^2)$—O— via its carbon atom in position 2 or 3;

$Z^2$ being a bicyclo[2.2.1]heptyl radical, preferably substituted on its carbon atom in position 7 with at least one $C_1$–$C_6$ alkyl radical, most particularly with two methyl radicals, the said bicyclo[2.2.1]heptyl radical being linked to the unit X of formula —O—$CH(R^{'1})$—$CH(R^{'2})$—O— via its carbon atom in position 2 or 3.

The blocks $[B]_n$ and $[CH(R^5)$—$CH(R^6)$—$O]_q$ are preferably polyoxypropylenated blocks $[PO]_n$ and $[PO]_q$.

Most particularly preferably, the symbol W represents a diblock group —$[B]_n$—$[C]_p$—, the block $[B]_n$ being a polyoxypropylenated block $[PO]_n$ and the block $[C]_p$ being a polyoxyethylenated block $[EO]_p$.

A subject of the present invention is, more particularly, the novel polyalkoxylated terpenic compounds of formula

or

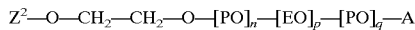

$Z^1$ and $Z^2$ having definitions identical to those given above.

As examples of these novel compounds, mention may be made in particular of those of formula:

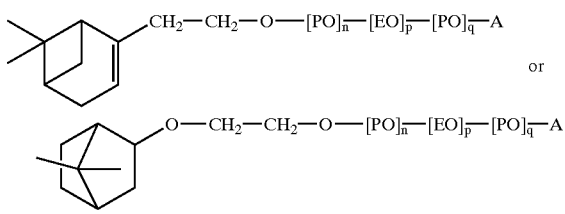

wherein A represents a hydrogen atom, a $C_1$–$C_6$ alkyl radical, an aryl or alkylaryl radical, a halogen atom, a group —$CH_2$—$CH(OH)R^7$, in which the symbol $R^7$ represents a linear or branched or cyclic $C_1$–$C_{22}$ alkyl or aryl radical, or a group chosen from —$SO_3M$, —$OPO_3(M)_2$, —$(CH_2)_a$—COOM, —$(CH_2)_b$—$SO_3M$, with a and b ranging from 1 to 6, M representing H, Na, K, Li, $N(RR'R''R''')+$ in which the symbols R, R', R", and R''' are identical or different and represent a hydrogen atom or a linear or branched or cyclic, optionally hydroxylated, $C_1$–$C_{22}$ alkyl radical.

These compositions are either prepared in the actual working medium during the implementation of the industrial paper de-inking process or, preferably, are prepared in advance.

In the case of preparation in advance, the compositions are stable over time and do not particularly require the presence of stabilizers.

Other compounds may be added in the preparation of the compositions or during their use in the de-inking process. In particular, sodium hydroxide, sodium silicate and hydrogen peroxide may be added.

The liquid composition according to the invention may be packaged in various forms allowing its use in all types of industrial device used for de-inking old ink-bearing papers. Thus, the liquid composition is used in its native form or in the form of a dilute solution, without any substantial changes in its performance qualities being noted.

The surfactants used in the context of the invention are prepared according to various processes.

By way of example, the surfactants forming the subject of the invention can be prepared by successive polyalkoxylation reactions of the reagent of formula Z—XH, by at least two different types of alkoxylation agent, one of which is ethylene oxide and the other(s) is (are) a higher alkylene oxide, with final alkoxylation using a higher alkylene oxide, followed by optional functionalization of the terminal hydrogen atom.

More specifically, the said reagent Z—XH is subjected to successive polyalkoxylation reactions, with:

alkylene oxide (AO1) of formula:

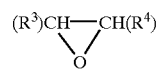

alkylene oxide (EO) of formula:

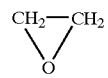

and alkylene oxide (AO2) of formula:

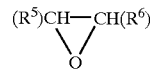

$R^3$, $R^4$, $R^5$ and $R^6$ having definitions identical to those given above.

The said alkylene oxides (AO1) and (EO) are introduced successively and the alkylene oxide (AO2) is introduced at the end, in order to obtain a product of formula:

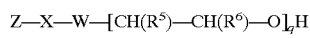

in which W and q have definitions identical to those given above, optionally followed by functionalization to convert the terminal hydrogen atom into one of the substituents A other than hydrogen, as defined above.

Thus, the novel polyalkoxylated terpenic compounds of formula (I) forming the subject matter of the invention, in which formula X represents —$CH_2$—$C(R^1)(R^2)$—O—, can be obtained by polyalkoxylation reaction of a reagent of formula (I'):

$$Z-CH_2-C(R^1)(R^2)OH \qquad (I')$$

in which the symbols Z, $R^1$ and $R^2$ have definitions identical to those given above, with alkylene oxide (AO1), alkylene oxide (EO) and alkylene oxide (AO2).

The said alkylene oxides (AO1) and (EO) are introduced successively and the alkylene oxide (AO2) is introduced at the end, to give a product of formula:

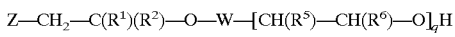

$$Z-CH_2-C(R^1)(R^2)-O-W-[CH(R^5)-CH(R^6)-O]_qH$$

in which W and q have the definition given above, optionally followed by functionalization to convert the terminal hydrogen atom into one of the substituents A other than hydrogen, as defined above.

The novel polyalkoxylated terpenic compounds of formula (I) forming the subject matter of the invention, in which formula X represents —O—CH(R'$^1$)—CH(R'$^2$)—O—, can be obtained by polyalkoxylation reaction of a reagent of formula (I"):

$$Z-O-CH(R'^1)-CH(R'^2)OH \qquad (I'')$$

in which the symbols Z, R'$^1$ and R'$^2$ have definitions identical to those given above, with alkylene oxide (AO1), alkylene oxide (EO) and alkylene oxide (AO2), by successive introduction of the alkylene oxides (AO1) and (EO) and introduction of the alkylene oxide (AO2) at the end, to give a product of formula:

$$Z-O-CH(R'^1)-CH(R'^2)-O-W-[CH(R^5)-CH(R^6)-O]_qH$$

in which W and q have the definition given above, optionally followed by functionalization to convert the terminal hydrogen atom into one of the substituents A other than hydrogen, as defined above.

The methods for preparing the reagents of formula (I') and (I") are described in International patent application WO 96/01245.

The alkylene oxides (AO1) and (AO2) are preferably propylene oxide.

The polyalkoxylation reactions are carried out according to the well-known methods at a temperature above 100° C., preferably between 120° C. and 250° C., most particularly between 150° C. and 200° C., in the presence of a catalyst (strong bases, aliphatic amines or Lewis acids). The operation is advantageously performed in the presence of an inert gas such as nitrogen or a rare gas such as argon or carbon monoxide, preferably at a pressure from about 1 to 4 bar. Further details regarding this type of reaction are given in International patent application WO 96/01245.

The alkylene oxide (AO1) and ethylene oxide (EO) are introduced successively, before introduction of the alkylene oxide (AO2) at the end. The amounts of alkylene oxide or of ethylene oxide used correspond to the numbers of molar equivalents n, p and q desired. The conditions for performing such a procedure are well known to those skilled in the art.

The optional functionalization operation to convert the terminal hydrogen atom into one of the other substituents A may be, for example, an etherification or esterification operation on the terminal hydrogen atom; this step is well known per se; it is preferably carried out after neutralization.

Thus, it is possible to carry out the preparation:

of ether sulphates (A=—SO$_3$M), according to the procedure described in GB 1 111 208 or U.S. Pat. No. 3,392,185;

of ether phosphates (A=—OPO$_3$(M)$_2$), according to the procedure described in U.S. Pat No. 3,331,896;

of ether carboxylates (A=—(CH$_2$)$_a$—COOM), according to the procedure described in U.S. Pat. No. 2,623,900 or U.S. Pat. No. 2,983,738;

of ether sulphonates (A=—(CH$_2$)$_b$—SO$_3$M), according to the procedure described in U.S. Pat. No. 2,115,192, U.S. Pat. No. 4,978,780 or K. SUGA, Austr. J. Chem., 21, 2333 (1968);

of alkyl ethers (A=alkyl), according to the procedure described in U.S. Pat. No. 2,913,416.

Further details regarding these functionalization methods are described in WO 96/01245.

The de-inking process using the liquid composition according to the invention consumes little in the way of energy and natural resources; in addition, it has little environmental impact, while at the same time providing high-quality regenerated paper pulp. This original process in which the liquid composition according to the invention is used comprises two phases.

The first phase is the pulping step in which the ink-bearing papers are placed in contact with the said composition and water in a pulper in order to convert the papers into pulp. The second phase comprises at least one flotation step in which the pulp is diluted in water. In this step, the pH is either unmodified or adjusted advantageously to basic pH. The basic pH is preferably between 8.5 and 9.

During the first phase, the usual additives not contained in the liquid composition are added where appropriate. In general, the composition according to the invention is advantageously used with a surfactant concentration from about 0.01% to 0.02% by weight in the medium of the first phase, although higher or lower concentrations are not excluded. The content of old ink-bearing papers to be treated represents 5% to 20% by weight, and more particularly between 10% and 15% by weight in the medium.

This operation of placing in contact can be carried out at room temperature, but is more particularly performed at a temperature of between 30° C. and 70° C. It takes place in any known type of pulping apparatus equipped with stirring and defibring means.

Once the operation for impregnation of the old paper with the mixture of the liquid composition and optional additives has been carried out, the pulp can be left to stand for 0.5 to 4 hours. In general, before the second phase comprising at least one flotation step, the pulp is diluted so as to obtain a concentration of pulp in water of from 1% to 3% by weight.

The second phase, known as the flotation phase, is then carried out. This is carried out by injecting air via the bottom of the tank. The foam formed entrains the ink particles and separates them from the pulp. The foam is entrained out of the tank by overflow or by suction.

The pulp freed of the ink particles can then be used in the preparation of papers.

As a variant according to the invention, one or more surfactants may be added after the pulping operation and before the flotation phase.

The non-limiting examples and tests which follow illustrate the preparation and use of the compositions according to the invention.

EXAMPLES

Examples 1 and 3 illustrate the use of de-inking preparations according to the invention and Examples 2 and 4 illustrate the use of a de-inking composition according to the prior art.

The efficacy of the de-inking treatment is determined by measuring the ISO whiteness of a sheet of paper formed from the pulp obtained from the pulping and flotation treatments.

Example 1

The first step corresponding to the pulping operation is carried out in a 2-liter pulper fitted with a Kenwood-type robot.

The surfactant of terpenic origin used, Nopol 3EO/3 OP, is of formula:

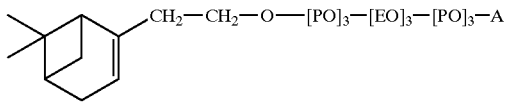

The mixture below is introduced into the pulper:
Newspapers about 6 months old: 200 g
Sodium hydroxide (25%): 5.6 g
Hydrogen peroxide (30%): 5.3 g
Terpenic surfactant: 0.44 g
Sodium silicate 7N34: 2.94 g
Water of controlled hardness ($3 \times 10^{-3}$ mol/l $Ca^{2+}$) at 50° C.: 1330 g The old papers are introduced into the pulper with the reagents, except for the hydrogen peroxide solution which is introduced after pulping for 2 minutes.

The pulping is carried out for about 20 minutes. The pulp is then left to stand at 45° C. for 30 minutes.

The second step, corresponding to the flotation, is carried out in a 15 liter flotation cell of Lamort type.

The pulp obtained above is diluted with water of controlled hardness as defined above, so as to obtain a solid suspension containing 1% solids. The flotation step is carried out at natural pH for 5 minutes by injecting air.

The floated suspension is then filtered through a handsheet puller. The handsheet is then dried and its ISO whiteness (diffuse blue reflectance factor), measured according to standard NF Q 03-039, is 46.

Example 2—Prior Art

Under the same conditions as in Example 1, the ethoxylated propoxylated fatty alcohol sold under the name Rhoditek 1000 by the company Rhodia Chimie is used instead of the composition according to the invention.

The suspension is then filtered through a handsheet puller. The handsheet is then dried and its ISO whiteness (diffuse blue reflectance factor), measured according to standard NF Q 03-039, is 46.6.

Example 3

The first step corresponding to the pulping operation is carried out in a 2-liter pulper fitted with a Kenwood-type robot.

The surfactant of terpenic origin used is of formula:

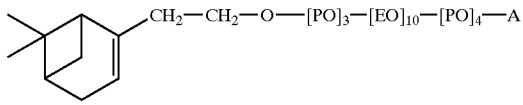

The mixture below is introduced into the pulper:
Mixture of old newspapers (40%) and old magazines (60%) 200 g
Sodium hydroxide (25%): 5.6 g
Hydrogen peroxide (30%): 5.3 g
Terpenic surfactant: 0.44 g
Sodium silicate 7N34 2.94 g
Water of controlled hardness ($3 \times 10^{-3}$ mol/l $Ca^{2+}$) at 50° C.: 1330 g The old papers are introduced into the pulper with the reagents, except for the hydrogen peroxide solution which is introduced after pulping for 2 minutes.

The pulping is carried out for about 20 minutes. The pulp is then left to stand at 45° C. for 30 minutes.

The second step, corresponding to the flotation, is carried out in a 15 liter flotation cell of Lamort type.

The pulp obtained above is diluted with water of controlled hardness as defined above, so as to obtain a solid suspension containing 1% solids. The flotation step is carried out at natural pH for 5 minutes by injecting air.

The floated suspension is then filtered through a handsheet puller. The handsheet is then dried and its ISO whiteness (diffuse blue reflectance factor), measured according to standard NF Q 03-039, is 57.2

Example 4—Prior Art

Under the same conditions as in Example 3, the ethoxylated propoxylated fatty alcohol sold under the name Rhoditek 1000 by the company Rhodia Chimie is used instead of the composition according to the invention.

The suspension is then filtered through a handsheet puller. The handsheet is then dried and its ISO whiteness (diffuse blue reflectance factor), measured according to standard NF Q 03-039, is 56.7.

What is claimed is:

1. A process for de-inking old ink-bearing papers in the presence of a liquid composition comprising a compound of polyalkoxylated terpenic origin of formula:

$$Z-X-W-[CH(R^5)-CH(R^6)-O]_q-A \qquad (I)$$

in which:
the symbol Z represents a bicyclo[a,b,c]heptenyl or bicyclo[a,b,c]heptyl radical, optionally substituted with at least one $C_1-C_6$ alkyl radical,
a, b and c being such that:
a+b+c=5,
a=2, 3 or 4,
b=1 or 2,
c=0 or 1,
the symbol X represents a group
—$CH_2$—$C(R^1)(R^2)$—O— in which the symbols $R^1$ and $R^2$, which may be identical or different, represent a linear or branched $C_1-C_6$ (cyclo)alkyl or (cyclo)alkenyl group,
or —O—$CH(R'^1)$—$CH(R'^2)$—O— in which the symbols $R'^1$ and $R'^2$, which may be identical or different, represent a linear or branched $C_1-C_{22}$ (cyclo)alkyl or (cyclo)alkenyl group, in particular methyl,
the symbols $R^5$ and $R^6$, which are different, represent for one a hydrogen atom and for the other a linear or branched $C_1-C_{22}$ (cyclo)alkyl or (cyclo)alkenyl group,
q is an average value between 1 and 30,
W represents a polyblock group comprising different blocks —$[B]_n$— and —$[C]_p$—,
B representing a group —$CH(R^3)$—$CH(R^4)$—O—, in which $R^3$ and $R^4$, which may be identical or different, represent a hydrogen atom or a linear or branched $C_1-C_{22}$ (cyclo)alkyl or (cyclo)alkenyl group, $R^3$ and $R^4$ being different when one of them represents hydrogen,
C representing an oxyethylenated group —$CH_2$—$CH_2$—O—(EO),
n being an average value between 1 and 10,
p being an average value between 1 and 100, said polyblock group W being linked to the unit X via one of its blocks —[B]$_n$—, A represents a hydrogen atom, a $C_1$–$C_6$ alkyl radical, an aryl or alkylaryl radical, a halogen atom, a group —$CH_2$—$CH(OH)R^7$, in which the symbol $R^7$ represents a linear or branched or cyclic $C_1$–$C_{22}$ alkyl or aryl radical, or a group chosen from —$SO_3M$, —$OPO_3(M)_2$, —$(CH_2)_a$—COOM, —$(CH_2)_b$—$SO_3M$, with a and b ranging from 1 to 6, M representing H, Na, K, Li, $N(RR'R''R''')^+$ in which the symbols R, R', R'' and R''' are identical or different and represent a hydrogen atom or a linear or branched or cyclic, optionally hydroxylated, $C_1$–$C_{22}$ alkyl radical wherein the process for de-inking old ink-bearing papers comprises two steps:

the first step comprising a pulping step in which the old ink-bearing papers are placed in contact with said liquid composition and water in a pulper in order to convert the papers into pulp, the second step comprising at least one flotation step in which the pulp is diluted in water at unmodified pH in the medium or at a pH modified to basic of between about 8.5 and 9.

2. The compound according to claim 1, wherein the symbol Z represents a radical $Z^1$ or $Z^2$:

$Z^1$ being a radical comprising:
bicyclo[3.1.1]heptenyl, optionally substituted on its carbon atom in position 6 with at least one $C_1$–$C_6$ alkyl radical, optionally with two methyl radicals, said bicyclo[3.1.1]heptenyl radical being linked to the unit X of formula —$CH_2$—$C(R^1)(R^2)$—O— via its carbon atom in position 2;

or bicyclo[2.2.1]heptenyl, optionally substituted on its carbon atom in position 7 with at least one $C_1$–$C_6$ alkyl radical, optionally with two methyl radicals, said bicyclo[2.2.1]heptenyl radical being linked to the unit X of formula —$CH_2$—$C(R^1)(R^2)$—O— via its carbon atom in position 2 or 3;

$Z^2$ being a bicyclo[2.2.1]heptyl radical, optionally substituted on its carbon atom in position 7 with at least one $C_1$–$C_6$ alkyl radical, optionally with two methyl radicals, said bicyclo[2.2.1]heptyl radical being linked to the unit X of formula —O—$CH(R'^1)$—$CH)(R'^2)$—O— via its carbon atom in position 2 or 3.

3. The process according to claim 1, wherein the blocks $[B]_n$ and $[CH(R^5)$—$CH(R^6)$—$O]_q$ are polyoxypropylenated blocks $[PO]_n$ and $[PO]_q$.

4. The process according to claim 1, wherein the symbol W represents a diblock group —[B]$_n$ —[C]$_p$—, the block [B]$_n$ being a polyoxypropylenated block [PO]$_n$ and the block [C]$_p$ being a polyoxyethylenated block [EO]$_p$.

5. process according to claim 2, wherein the novel polyalkoxylated terpenic compounds have the formula

or

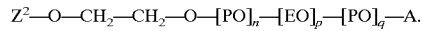

6. The process according to claim 5, wherein the compound has the formula:

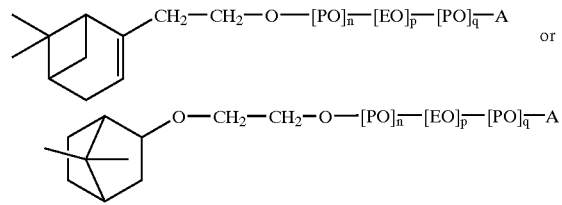

7. A liquid composition comprising an effective amount of the compound according to claim 1 for de-inking paper.

* * * * *